UNITED STATES PATENT OFFICE.

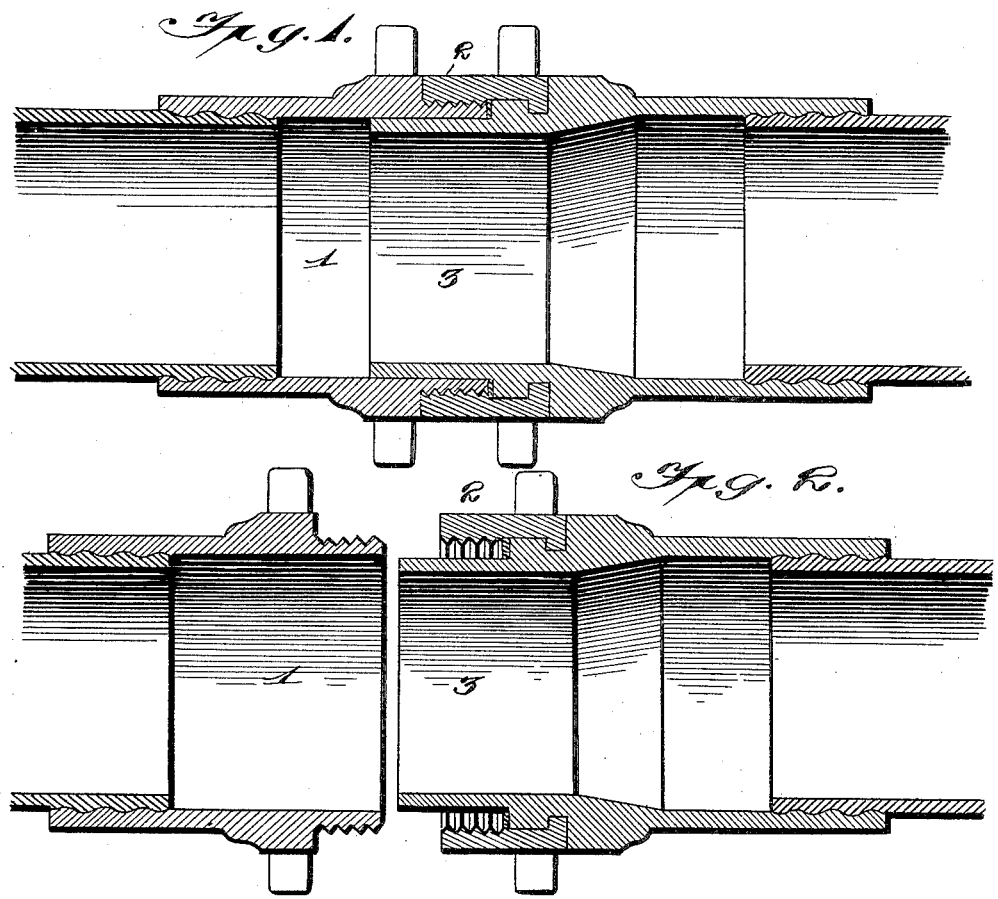

FELIX LOUIS DECARIE, OF MONTREAL, CANADA.

HOSE-PIPE CONNECTION.

SPECIFICATION forming part of Letters Patent No. 599,224, dated February 15, 1898.

Application filed November 5, 1896. Serial No. 611,138. (No model.)

*To all whom it may concern:*

Be it known that I, FELIX LOUIS DECARIE, a subject of the Queen of Great Britain, residing at Montreal, in the district of Montreal and Province of Quebec, Canada, have invented a new and useful Hose-Pipe Connection, of which the following is a specification.

Hose-pipe connections as generally constructed are devoid of means for guiding or directing the parts when fitting them together, so as to insure the threads coming squarely together without causing stripping or binding. It not unfrequently happens that much time is consumed and annoyance occasioned when placing the parts of a coupling together because of the threads not alining or coming squarely together, and if the parts are coupled when the threads are not in register the said threads will become stripped, and a subsequent coupling of the parts will be effected with difficulty and a possible leaky joint result.

The purpose of this invention is to give proper direction to the parts of a hose-pipe coupling, so that when assembling or placing them together they will be properly directed before the threaded parts engage, thereby insuring the matching of the threads and obviating any stripping or binding, because in every instance the threads come squarely together and aline.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a longitudinal section of a hose-pipe coupling having the parts connected. Fig. 2 is a view similar to Fig. 1, showing the parts separated.

Corresponding and like parts are referred to in the following description and indicated in both views of the drawings by the same reference characters.

The invention consists, essentially, of a guide applied to a part or member of a coupling and extending beyond the outer end thereof a sufficient distance, so as to telescope or engage with the other part or member to give proper direction to and cause the parts to approach each other squarely when placing them together, thereby insuring a matching of the threaded portions when the latter come together. This guide, which consists of a sleeve, may be applied to either part or member of the coupling, but is preferably fitted to the female part and is adapted to enter the male part when assembling or placing the complementary parts of the coupling together.

The coupling illustrated is of ordinary construction and comprises the male part or member 1 and the female part or member 2, the guide being represented by the numeral 3 and projecting beyond the outer end of the part 2 a proper distance to attain the end aforesaid. The guide or sleeve 3 is smooth on its inner and outer surfaces and is of a size to snugly fit within the part 1 and obviate any play, thereby causing the parts of the coupling to come squarely together when it is required to effect a union of the coupling.

Having thus described the invention, what is claimed as new is—

In a pipe-coupling, the combination of a member having an end portion exteriorly threaded and having the bore of the threaded end of uniform diameter, and a second member comprising an internally-threaded portion to receive the screw upon the exteriorly-threaded end of the first-mentioned member, and a guide portion passing through the internally-threaded portion and interlocking therewith at its inner end and projecting beyond its outer extremity, and of a diameter corresponding to the internal diameter of the first-mentioned member to snugly fit therein and compel the threaded portions to come squarely together, substantially as specified.

In testimony that I claim the foregoing as my own I have hereto affixed my signature in the presence of two witnesses.

FELIX LOUIS DECARIE.

Witnesses:
 HENRI DE MARTIGNY,
 GEO. BEANSOBY.